United States Patent
Fujimoto et al.

(10) Patent No.: US 6,238,291 B1
(45) Date of Patent: May 29, 2001

(54) CARTRIDGE, GAME MACHINE AND BI-DIRECTIONAL COMMUNICATION TYPE GAME SYSTEM

(75) Inventors: Jun Fujimoto; Nobuyuki Nonaka; Masahiro Yamaguchi, all of Tokyo (JP)

(73) Assignee: Seta Corporation, Tokyo (JP)

( * ) Notice: Subject to any disclaimer, the term of this patent is extended or adjusted under 35 U.S.C. 154(b) by 0 days.

(21) Appl. No.: 09/200,451

(22) Filed: Nov. 27, 1998

(30) Foreign Application Priority Data

Oct. 15, 1998  (JP) .................................................. 10-293801

(51) Int. Cl.$^7$ .............................. A63F 13/00; A63F 9/24; G06F 17/00; G06F 19/00
(52) U.S. Cl. ................................ 463/44; 463/43; 463/45; 463/46; 463/47; 273/148 B; 273/148 R
(58) Field of Search .................................. 463/44, 45, 46, 463/47, 43, 30; 273/148 B, 148 R

(56) References Cited

U.S. PATENT DOCUMENTS

| | | | |
|---|---|---|---|
| 3,779,553 | * 12/1973 | Secter | 273/130 AB X |
| 5,007,649 | * 4/1991 | Richardson | 273/237 X |
| 5,358,259 | * 10/1994 | Best | 273/434 |
| 5,393,073 | * 2/1995 | Best | 273/434 |
| 5,396,225 | * 3/1995 | Okada et al. | 340/825.21 X |
| 5,956,485 | * 9/1999 | Perlman | 395/200.34 X |
| 5,961,386 | * 10/1999 | Sawaguchi | 463/43 X |
| 5,971,855 | * 10/1999 | Ng | 463/42 X |
| 6,042,478 | * 3/2000 | Ng | 463/44 X |

FOREIGN PATENT DOCUMENTS

| | | |
|---|---|---|
| 6-61390 | 8/1994 | (JP) . |
| 7-204349 | 8/1995 | (JP) . |
| 2-2784409 | 5/1998 | (JP) . |
| 10-235016 | 9/1998 | (JP) . |

* cited by examiner

Primary Examiner—Jessica J. Harrison
Assistant Examiner—Binh-An D. Nguyen
(74) Attorney, Agent, or Firm—Oliff & Berridge, PLC

(57) ABSTRACT

A game which two or more players can play, such as cards and mahjong, is played by connecting a home TV game machine with portable game machines having displays, where images for a common field are displayed on the TV, and private hands of a player, which should be concealed from the other players, are displayed only on a display of the player's local machine so that strategies an actual game is enjoyed.

A plurality of portable game machines with displays are connected via a cartridge to a home TV game machine to which a ROM cassette is inserted for playing a game. The cartridge of which one end is inserted to the portable game machine for connection has a connection terminal on the other end, and the connection terminal and a controller connection terminal of the home TV game machine are connected with a communication cable. The cartridge houses a ROM having built-in software, and an interface to enable bi-directional communication of data and S-RAM for storing data so that bi-directional communication between the home TV game machine and the portable game machine is possible. The ROM cassette has a built-in master software for displaying images which all players can see, and the cartridge has a built-in slave software for displaying a player's private hand only on the display of the local machine.

6 Claims, 11 Drawing Sheets

(LIQUID CRYSTAL DISPLAY OF PORTABLE GAME MACHINE)

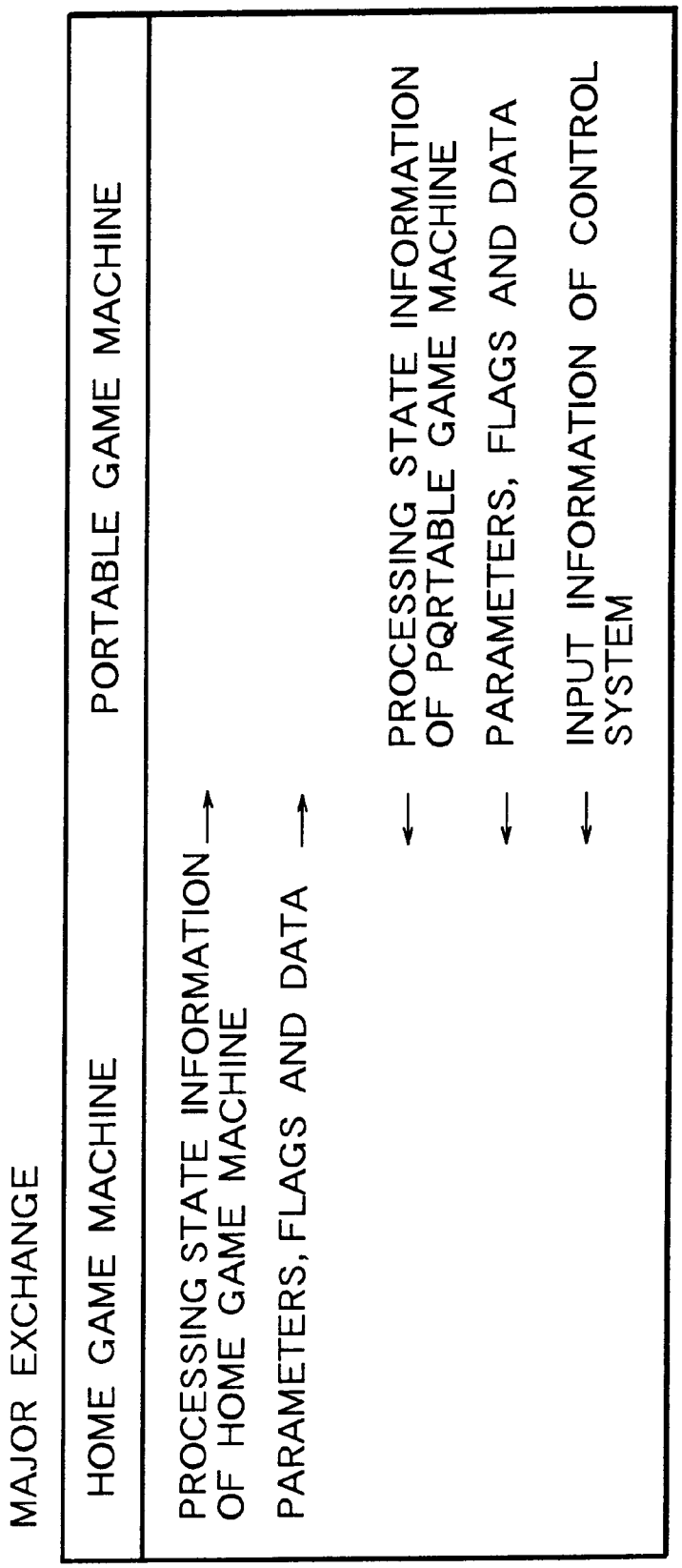

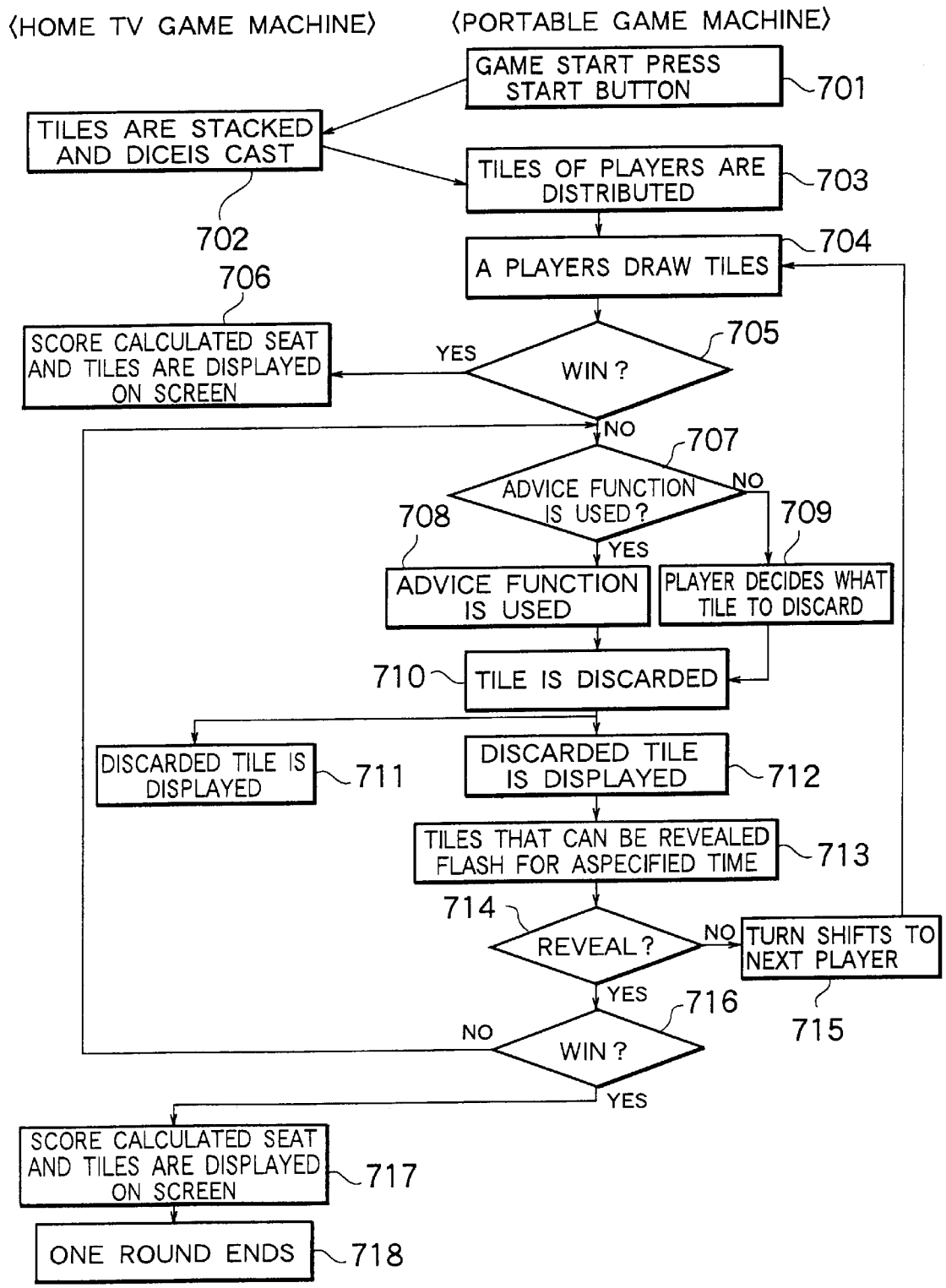

CARTRIDGE, GAME MACHINE AND BI-DIRECTIONAL COMMUNICATION TYPE GAME SYSTEM

BACKGROUND OF THE INVENTION

1. Field of the Invention

The present invention relates to a cartridge, a game machine and a bi-directional communication type game system that makes it easy to play a game which requires connecting a plurality of portable game machines to one TV game machine for displaying common images on the TV screen for all to see, and for displaying individual images on the portable game machine display screen for only the individual player to see.

2. Description of the Related Art

TV game machines and portable game machines have each been commercialized, but each machine plays a single game. Bi-directional communication between different machines, such as between a TV game machine and a portable game machine connected to share the same game, have not yet been commercialized. The only exception is playing a match game connecting the same portable game machines to one another using communication cables.

Often, concealing a player's hand is a key to enjoying and implementing strategy in a game, such as is the case of mah-jong. When playing a game with a TV game machine using controllers (without displays), the players commonly see the same TV screen. This results in all players seeing all other players' hands, rendering it impossible to play the game according to the original intent of the game. Therefore, in the current situation, game conditions must be set such that a player cannot see other players' hands, for example, one human player vs. three computer players. This imposes many constraints to enjoyment of the game.

If the above game is played using portable game machines connected with communication cables, a player's hand can be seen only on an individual screen without being seen by the other players since the portable game machine is provided with a liquid crystal display. This overcomes the hand viewing dilemma as a common screen is not available, i.e., a "common field", which all players need to see during the game to inform them of the kind of tiles which are discarded and the number of tiles that still remain in mah-jong, for example.

Generally when playing a game such as mah-jong, one does not know which tile another player will discard, the number of tiles another player will draw, whether the player will reveal tiles or what private strategy a player is forming, merely by looking at the screen. Generally, it is not fair if one player's private strategy is revealed to the other players by viewing the movements of their hands during the game. When two or more players play a game together, if a player looks at the controller of another player, the strategy of the other player is known. In arcade games, a partition curtain is set to partition the display horizontally, so that players cannot see the screens or hand strategies of others. This, however, is far from the spirit of original gaming, because players cannot read the expressions of other players and cannot observe the gestures of other players.

As described above, a bi-directional communication type game system to share a game connecting different models, such as a TV game machine and portable game machine, has not yet been commercialized. When a game as mah-jong, is played, a player's hand cannot be concealed when using a TV game machine, since individual screens do not exist, and the game cannot be played smoothly when using a portable game machine since a common screen does not exist. In both cases, it is impossible to enjoy such a strategy oriented thinking game if other players can see the other players' hands thus revealing their strategy.

Home TV game machines are based on playing games at home. Portable game machines are used in a wide environment, including in homes and outdoors. If both types of machines could be connected to share a game, utilizing the respective advantages of home game machines and portable game machines, the above mentioned type of games could be supported and games would diversify. The present invention was made based on this knowledge.

SUMMARY OF THE INVENTION

An object of the present invention is to provide a cartridge, a game machine and a bi-directional communication type game system which solve the problems of the prior art described above by exchanging data directionally by connecting a TV game machine and portable game machines so that new game play becomes possible.

An example of a portable game machine is Gameboy (registered trademark) which has a liquid crystal display and a cross-key. An example of a TV game machine which bi-directionally communicates with the portable game machine is "NINTENDO 64" (registered trademark), "Super Famicon" (product name), and "Family Computer" (product name), where a plurality of controllers are connected so that two or more players can play at the same time.

Appropriate games are thinking games played by two or more players, such as mah-jong, Hanafuda, cards (poker, seven card bridge, canasta), where no game-strategy is established if tiles or cards of a player are revealed to the other players. This system can also be applied to games where a player's hand can be revealed to the other players, such as bowling, go, shogi and chess without detracting from the spirit of the game. Likewise, the system can be applied to a one player game, such as solitaire. The desirable RAM for these types of games is S-RAM (Static RAM), which can hold stored content for a long time by using a backup battery.

ROM stores a game program to a TV game machine and a portable game machine respectively. The ROM for a game stores the program content in the TV game machine for developing an overall game, whereas, the ROM of the portable game machine stores the program content for assisting the game development of a player or for progressing a game. In the case of a game played by two or more players, such as mahjong, the former program content relates to the general and common aspects of the game which the other players can see, and the latter program content relates to the individual and confidential aspects of the game, that is, tiles or cards that the other players should not see. The program of the portable game machine normally has content which allows a single player to play alone, so that playing a game is possible even if disconnected from a TV game machine. In the case of bi-directional communication, it is instructed such that a stand-alone program is not executed but a common program linked with the program for a home TV game machine is executed, and concealed content is displayed only on the display of the local machine.

The simplest and least expensive way to connect a TV game machine and a portable game machine with a display is to use a communication cable. However, infrared communication or high frequency radio communication may also be used as the means of communication. For bi-directionally exchanging data required for development of a game between the TV game machine and the above mentioned portable game machine, image display instructions and voice output instructions sent from the TV game machine to the portable game machine, and data required for bi-directional communication sent from the portable game machine to the TV game machine, such as the input information of the control system are used.

Common images that any player can see are discarded tiles, stacked tiles and revealed tiles of mah-jong, for example, which are displayed on the display of the TV game machine. Individual images which only one player can see are the player's own tiles and drawn tiles, which are displayed only on the display of the portable game machine.

The program content to develop an overall game is stored on the cassette for the TV game machine, and the program content to assist game development of an individual player or to progress the game is stored on the cartridge for the portable game machine with a display. The TV game machine, with a display where the cassette for the TV game machine is set, and the portable game machine, with a display where-the-cartridge for the portable game machine is set, are connected. Data required for development of the game is bi-directionally exchanged between the TV game machine and the portable game machines based on both machine's programs. Common images that any player can see are displayed on the display of the TV game machine, and individual images which only a particular player can see are displayed on the display of the respective portable game machine.

The present invention is a cartridge for connecting the portable game machine to the TV game machine. The invention comprises a connection terminal for a portable game machine to be connected to the above mentioned portable game machine, and a case with a connection terminal for a home TV game machine to be connected to the TV game machine via a communication cable. The above mentioned invention further comprises a bus for connecting both of the above mentioned connection terminals, an interface which is connected to the bus for enabling bi-directional communication between the portable game machine and the TV game machine, a ROM which is connected to the above mentioned bus for storing the program content of a prescribed game, and a RAM for storing saved data to be added to the content of the above mentioned game.

If a portable game machine is connected to a TV game machine to perform bi-directional communication, using the simple structure of merely installing a bus and a control circuit to a conventional cartridge having ROM, new game play where independent screens are displayed on the display of the portable game machine and on the display of the TV game machine, such as a thinking game by two or more players which a TV game machine or a portable game machine could not implement alone, can be enjoyed without revealing a player's hands or strategies to the other players.

In the above invention, it is desirable that the above mentioned interface comprises: a selector for selectively connecting the above mentioned RAM to the above mentioned connection terminal for a home TV game machine or to the above mentioned connection terminal for a portable game machine; a state register for storing the selected state of the above mentioned selector; a buffer for relaying the content of the above mentioned state register to the connection terminal for a home TV game machine and the connection terminal for a portable game machine; a data register for temporarily storing such data as image display instructions and voice output instructions which are input from the connection terminal for a home TV game machine, outputting the data to the connection terminal for a portable game machine, temporarily storing such data as the input information of the control system which is input from the connection terminal for a portable game machine, and outputting the data to the connection terminal for a home TV game machine; and a decoder connected to the above mentioned connection terminal for a home TV game machine and the connection terminal for a portable game machine, for decoding signals which are input from the above mentioned connection terminal for a home TV game machine and the above mentioned connection terminal for a portable game machine respectively, and generating control signals to be sent to the above mentioned RAM, above mentioned selector, above mentioned state register, above mentioned data register and above mentioned buffer respectively.

A game machine can be constructed by the cartridge of the above mentioned invention, whereby, the cartridge and communication means connect the portable game machine to the above mentioned TV game machine via the above mentioned cartridge. A bi-directional communication type game system can be constructed by a TV game machine, a detachable cassette providing game content for the TV game machine to be linked with the program content of the above mentioned ROM for bi-directional communication with a portable game machine, the cartridge of the above mentioned invention, a plurality of portable game machines to which the cartridge is detachably set, and communication means for connecting the plurality of portable game machines to the TV game machine via the cartridge.

BRIEF DESCRIPTION OF THE DRAWINGS

FIG. 10 is an explanatory drawing depicting a major exchange; and

FIG. 11 is a flow chart describing a round of mah-jong in accordance with the embodiment.

DETAILED DESCRIPTION OF PREFERRED EMBODIMENTS

Preferred embodiments of the present invention are described below.

Figure 1:
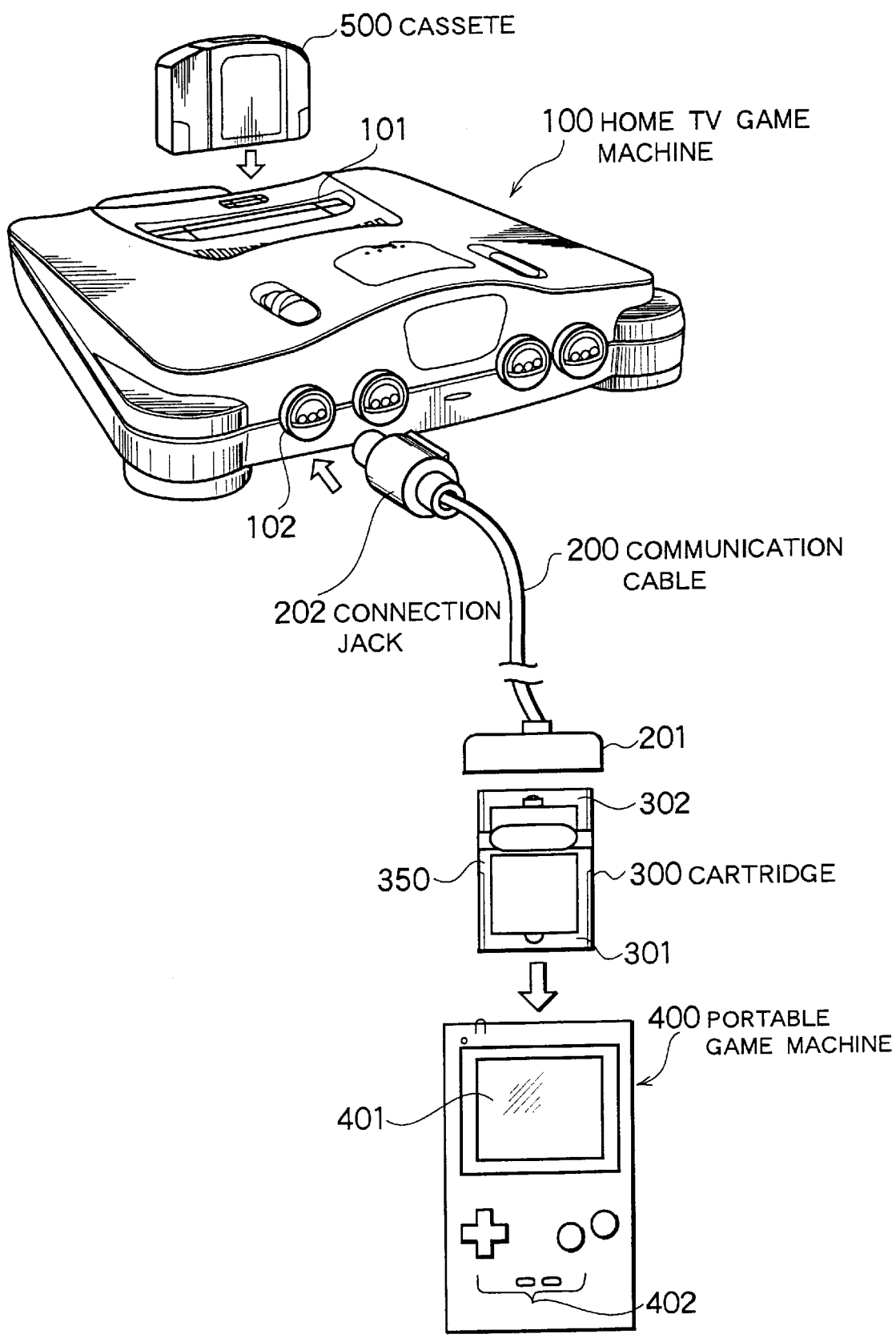
FIG. 1 is a concrete structural drawing depicting the game machine system of the embodiment.

FIG. 1 shows a configuration of a bi-directional communication type game system in accordance with the present invention. The bi-directional communication type game system comprises a home TV game machine 100 which uses a ROM cassette 500 using a mask ROM as a game software, a portable game machine 400 which uses a cartridge 300 as a game software, and a communication cable 200 which connects the home TV game machine 100 and the portable game machine 400 via the above mentioned cartridge 300.

A TV as a display, a controller as a control system, and other components are externally connected to the home TV game machine 100. The home TV game machine comprises a ROM cassette insertion port 101 for inserting the ROM cassette 500, a voice/image output terminal (not illustrated) to be connected to a video input terminal of the TV, and a plurality of (four in the illustrated example) controller connection terminals 102 so that game content can be displayed on the TV screen for playing, the game.

The portable game machine 400 comprises a liquid crystal display 401 used as a monitor and a control system 402 including a cross-key and push buttons, which are built-in, and controls the home TV game machine 100 by setting a cartridge 300 and connecting the cartridge 300 to the home TV game machine 100.

The communication cable 200 has a connection terminal 201 to be connected to the cartridge 300 of the portable game machine at one end, and a connection jack 202 to be connected to a controller connection terminal 102 of the home TV game machine 100 at the other end, and transmits data to be exchanged for bi-directional communication between the portable game machine 400 and the home TV game machine 100.

The ROM cassette 500 houses ROM storing a game software. Content of the game software is content primarily related to the common screen (images that the other players can see) of the game.

The cartridge 300 has a connection terminal 301 for a portable game machine 400 at one end and a connection terminal 302 for a home TV game machine 100 at the other end to implement bi-directional communication. The connection terminal 301 for a portable game machine 400, which is inserted to the cartridge insertion port of the portable game machine 400, is located at one end of the case 350, and the connection terminal 302 for a home TV game machine 100, which is connected with the connection terminal 201 of the communication cable 200, is located at the other end of the case 350. The case 350 houses a ROM storing a game software, and a control circuit 308 required for bi-directional communication between the portable game machine 400 and the TV game machine 100. The content of the game software provided in cartridge 300 is content primarily related to an individual screen of a common game (images which the other players should not see).

Figure 2:
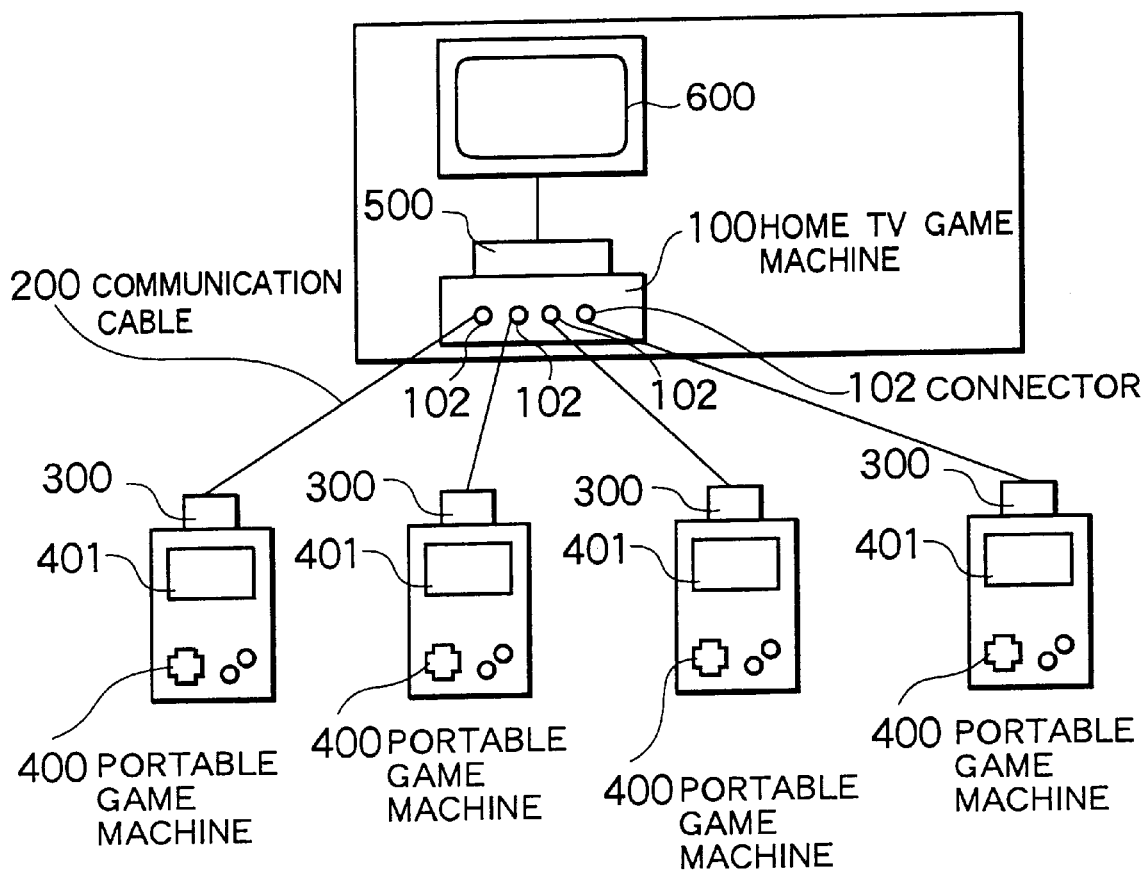
FIG. 2 is a rough structural drawing depicting the game machine system of the embodiment.

FIG. 2 is a schematic illustration depicting the bi-directional communication type game system when a maximum number of portable game machines 400 are connected to one home TV game machine 100.

Figure 3:
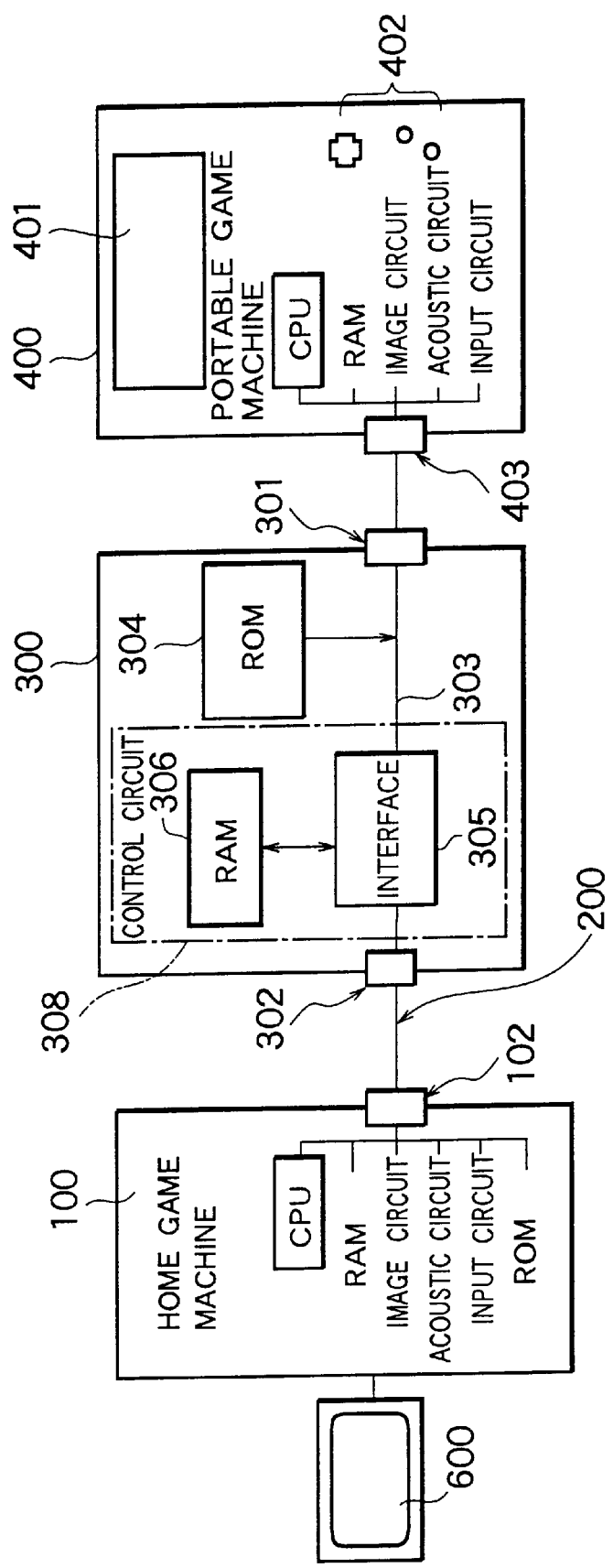
FIG. 3 is a block diagram depicting the game machine system of the embodiment.

FIG. 3 is a functional block diagram depicting the home TV game machine 100, the cartridge 300 and the portable game machine 400.

The home TV game machine 100 comprises a CPU, a RAM, an image circuit, an acoustic circuit, an input circuit, a ROM and a connection terminal 102, to which the TV 600 is externally connected when the home TV game machine 100 is used for an ordinary game. The input device (a control pad or a controller) is connected to the connection terminal 102 of the home TV game machine 100 and to cartridge 300 from portable game machine 400. The acoustic-circuit is connected to a speaker which is not illustrated.

The portable game machine 400 comprises a CPU, a RAM, an image circuit, an acoustic circuit, an input circuit and a connection terminal 403. When a conventional portable game machine 400 is used by itself, a conventional type cartridge 300 is connected to the above mentioned connection terminal 403 of the portable game machine 400, and the program of the game built-in to the ROM inside the cartridge is used for playing. The acoustic circuit is connected to a speaker which is not illustrated.

Figure 4:
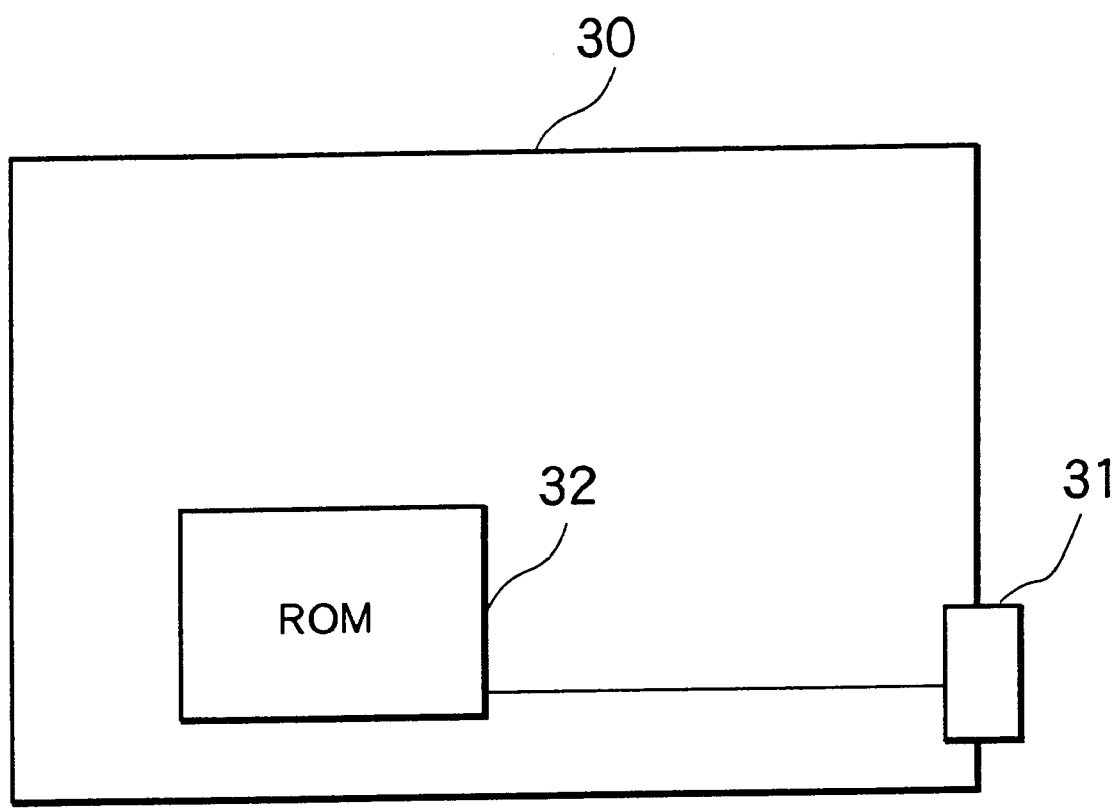
FIG. 4 is an internal structural drawing depicting a conventional cartridge.

In the internal configuration of the cartridge 300 of the present invention, a bus 303 to which an interface 305 is connected to enable bi-directional communication between the home TV game machine 100 and the portable game machine 400 runs between the connection terminal 301 for a portable game machine 400 and the connection terminal 302 for a home TV game machine 100. The ROM 304 storing game software is connected to the bus 303 and the RAM 306 which temporarily stores saved data is connected to the interface 305. The saved data here includes input information of the control system 402 of the portable game machine 400, program processing status information of the portable game machine 400, program processing status information of the home TV game machine 100, parameters, flags and data from the home TV game machine 100 to the portable game machine 400, and parameters, flags and data from the portable game machine 400 to the home TV game machine 100. The interface 305 and the RAM 306 comprise the control circuit 308 of the present invention. FIG. 4 shows a functional block of a conventional cartridge 30 for comparison. As is clearly shown, while a conventional cartridge 30 houses only a ROM 32 connected to one connection terminal 31, the cartridge 300 of this embodiment has the RAM 306, the interface 305, and the connection terminal 302 to be connected to the home TV game machine 100 in addition to the ROM 304.

In this way, the interface 305 is installed in the new type cartridge 300, and a line for transmitting data control signals connects between the above mentioned connection terminals 102 and 302, and between the above mentioned connection terminals 403 and 301 respectively, so that a bi-directional data exchange is possible between the home TV game machine 100 and the portable game machine 400.

The CPU of the portable game machine 400 processes a program stored in the ROM 304 in the cartridge 300 for a portable game machine 400, and displays the result on the display 401. The portable game machine CPU also reads the image data from the ROM 304, based on the image data instructions transferred from the home TV game machine 100, and displays the data on the display 401. The portable game machine CPU also transfers control signals of the control system 402 to the home TV game machine 100 via the bus 303 and the interface 305. The CPU of the home TV game machine 100, on the other hand, processes a program stored in the ROM in the cassette 500 for a home TV game machine, and displays the result on the TV 600. The portable game machine CPU also transfers the image data instructions, which are for displaying the prescribed image data stored in the ROM 304 on the display 401 of the portable game machine 400, to the portable game machine 400. The CPU also receives and processes signals which are generated based on the control of the control system 402 from the portable game machine 400.

Information to be displayed on the display 401 of the portable game machine 400 and the TV 600 of the home TV game machine 100 is not only image data but also includes character and symbol data.

Figure 5:
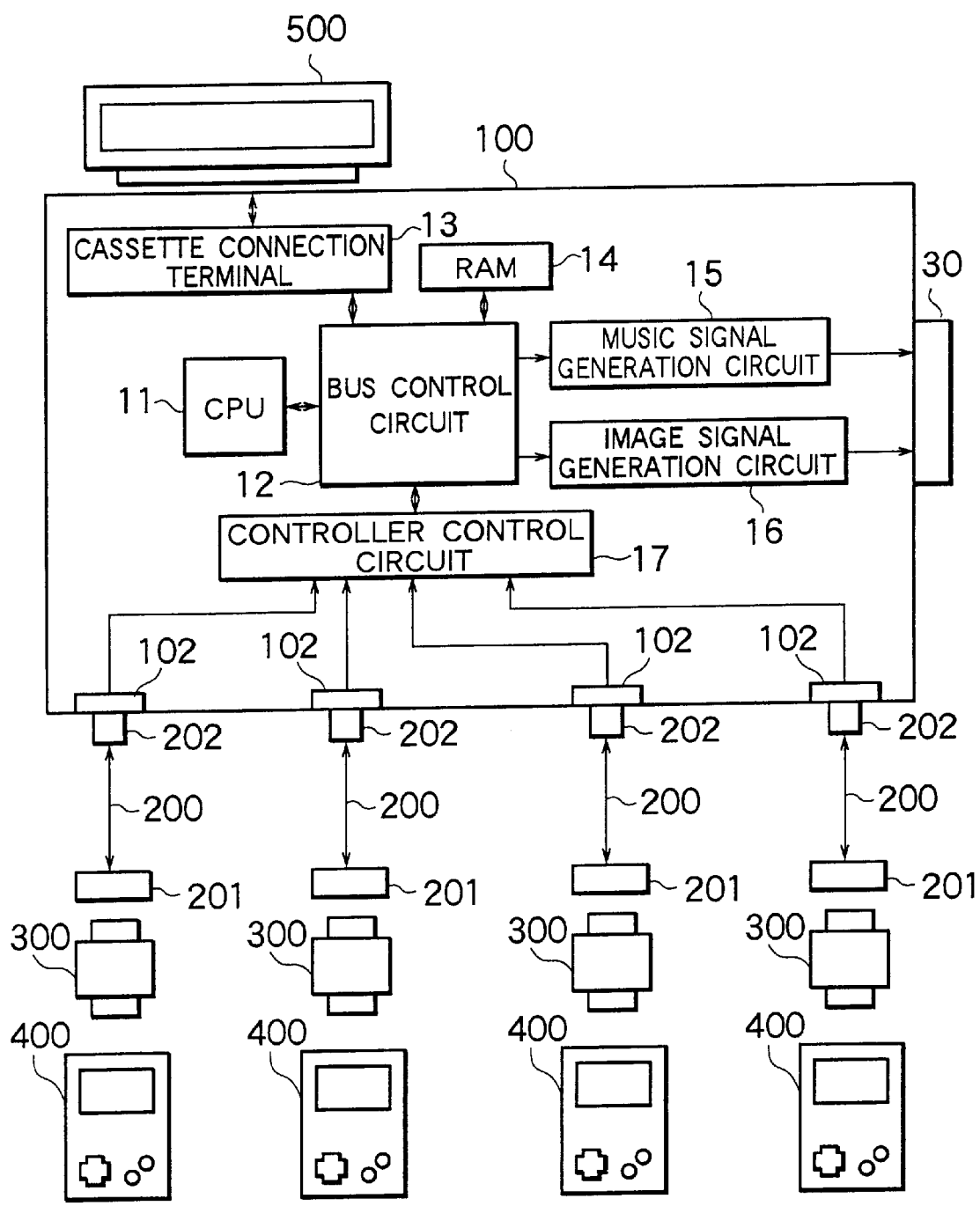
FIG. 5 is a concrete block diagram depicting the home TV game machine of the embodiment.

FIG. 5 is a detailed block diagram of the above mentioned home TV game machine 100. The home TV game machine 100 houses a CPU 11, and a bus control circuit 12. The connection terminal 13 for detachably setting the ROM cassette 500, and the RAM 14 are connected to the bus control circuit 12. A music signal generation circuit 15 for outputting voice signals to be processed by the CPU 11, and the image signal generation circuit 16 for outputting the image signals are also connected to the bus control circuit 12. A controller control circuit 17 used for the serial transfer of control data of one or more portable game machines 400 and/or data of the cartridge 300 is also connected to the bus control circuit 12.

A controller connection terminal 202, which is installed on the front face of the home TV game machine 100, is connected to the controller control circuit 17. To the connection terminal 102, the portable game machine 400 is detachably connected via the connection jack 202, the communication cable 200, the connection terminal 201 and the cartridge 300. In this way, the portable game machine 400 is electrically connected with the home TV game machine 100 by connecting the portable game machine 400 to the connection terminal 102, which makes mutual transmission and reception of data possible.

More concretely, the bus control circuit 12 receives a command which is output as parallel signals from the CPU 11 via the bus, performs parallel—serial conversion, outputs the command as serial signals to the controller control circuit 17, converts the data of serial signals which are input from the controller control circuit 17 to parallel signals, and outputs the data to the bus. The data output from the bus is processed by the CPU 11, or is stored to the RAM 14. This means that the RAM 14 is a memory for temporarily storing data to be processed by the CPU 11, and that data can be read or written via the bus control circuit 12.

Figure 6:
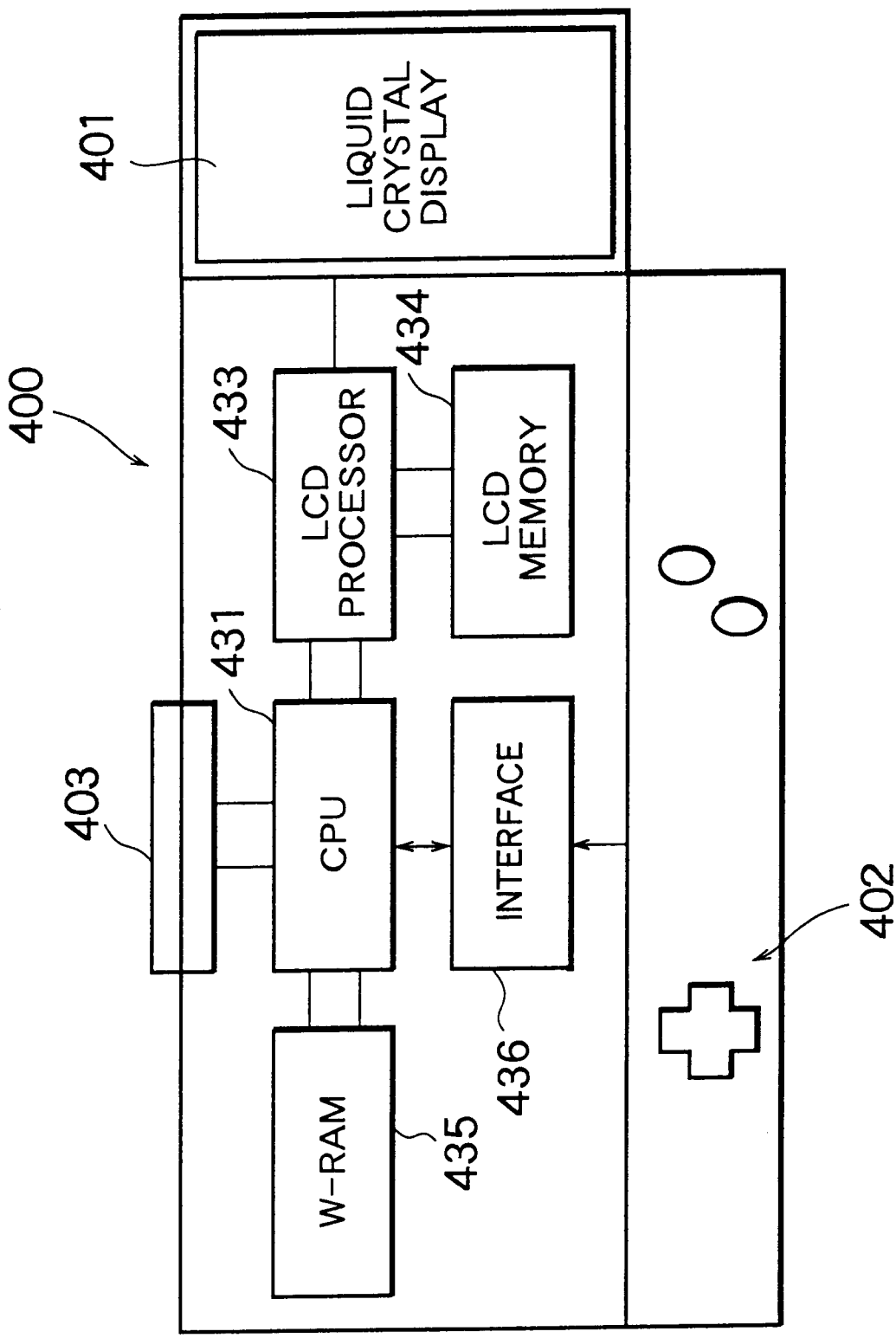
FIG. 6 is an internal structural drawing depicting the portable game machine of the embodiment.

FIG. 6 shows a concrete block diagram of the portable game machine 400. A data bus and an address bus of the portable game machine 400 are connected to the connection terminal 403. The CPU 431 and the interface 305 in the cartridge 300 are connected by detachably connecting the connection terminal 301 of the cartridge 300 to the connection terminal 403. An LCD processor 433 to generate signals for displaying images on the liquid crystal display 401 is connected to the CPU 431. The CPU 431 and the LCD processor 433 comprise the image signal generation means. An LCD memory 434 is connected to the LCD processor 433. A working RAM (W-RAM) 435 is also connected to the CPU 431. The W-RAM 435 is used as a working area to temporarily store processing data for game processing, or as an image data transfer buffer. The CPU 431 also connects the control system 402, such as the cross-key, and the push button switch via the interface 436.

The interface 436 reads signals which change depending on the pressing state of the cross-key and push button switch, responding to the output instruction signals of the switch state sent from the interface 436 at a constant interval, and sends the data to the CPU 431.

For a concrete explanation of image processing, the data from the CPU 431 is sent to the LCD memory 434 via the LCD processor 433, and the data from the LCD memory 434 is sent to the LCD processor 433 for processing. The LCD processor 433 processes the music signal data and the image signal data sent from the LCD memory 434, and stores the data to the LCD memory 434 again. Then the LCD processor 433 reads the music signal data and the image signal data from the LCD memory 434 according to the instructions of the CPU 431.

Figure 7:
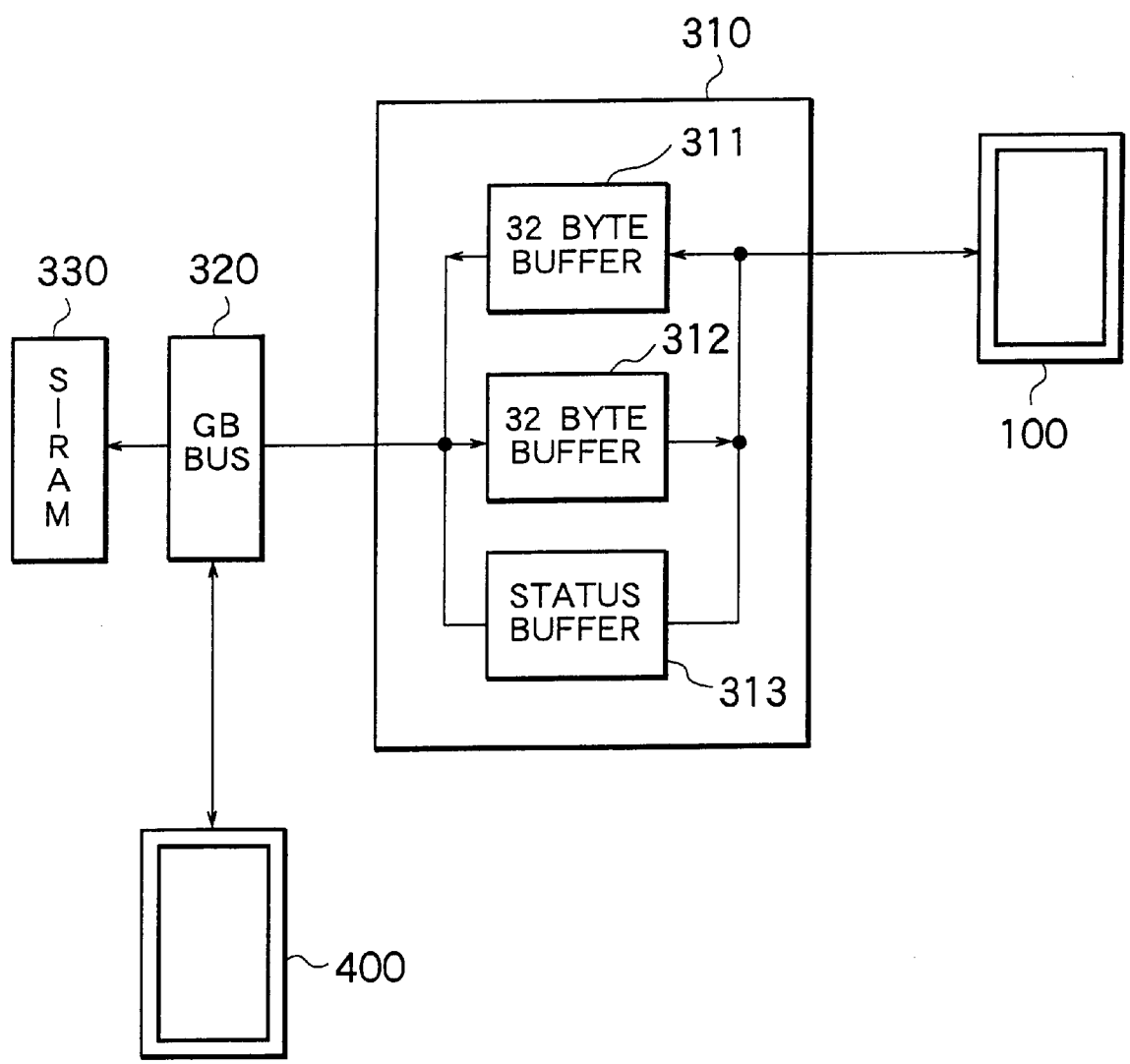
FIG. 7 is a block diagram depicting the inside of the cartridge of the embodiment.

FIG. 7 shows a simplified block diagram depicting the inside of the cartridge, which is a control circuit 308 without the ROM which stores game software. The control circuit 308 comprises image display instructions or sound effects output instructions which are output from the home TV game machine 100 to the portable game machine 400, the interface 310 which performs bi-directional data transfer by sending the input information of the control system 402 output from the portable game machine 400 to the home TV game machine 100, a GB bus 320 for connecting the home TV game machine 100 and the portable game machine 400, and the static RAM (S-RAM) 330 for storing the saved data.

The interface 310 can be constructed as one chip, and comprises a 32 byte buffer 311, for temporarily storing the data to be transferred from the home TV game machine 100 to the S-RAM 330 or to the portable game machine 400, a 32 byte buffer 312 for temporarily storing the data to be transferred from the portable game machine 400 to the S-RAM 330 or the home TV game machine 100, and the status buffer 313 for storing information on movement of the currently executing process (i.e., whether the home TV game machine 100 is operating or the portable game machine 400 is operating).

In this way, the data from the home TV game machine 100 is sent to the SRAM 330 or to the portable game machine 400 via the 32 byte buffer 311 and the GB bus 320. The data from the portable game machine 400 is transferred to the home TV game machine 100 by way of the GB bus 320, the S-RAM 330 or the GB bus 320, and the 32 byte buffer 312.

Figure 8:
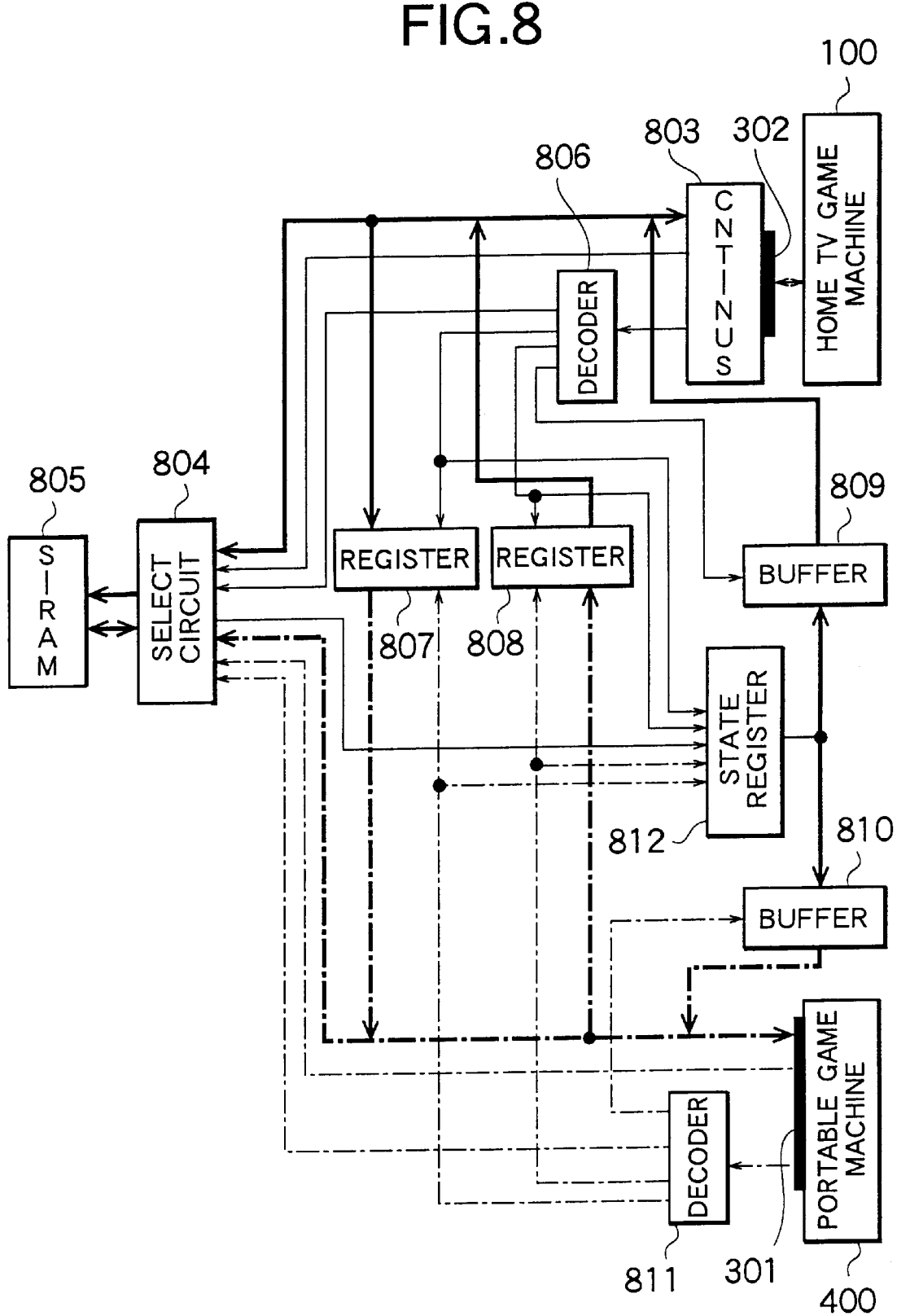
FIG. 8 is a detailed block diagram depicting the inside of the cartridge of the embodiment.

FIG. 8 shows a more concrete block diagram of the control circuit 308.

A solid line connecting blocks indicates a bus of the home TV game machine system, and a dash and dotted line indicates a bus of the portable game machine system. A thick solid line or a thick dash and dotted line indicates a data bus, and a thin line indicates an address bus or a control bus. The home TV game machine 100 is connected to the S-RAM 805 by buses through the connection terminal 302, via the bus control circuit 803 for multiplexing addresses and data and the select circuit 804, so that the saved data is written from the home TV game machine 100 to the S-RAM 805, and the data is read from the S-RAM 805 and is added to the content of the game of the home TV game machine 100.

The portable game machine 400 is connected to the S-RAM 805 by buses through the connection terminal for a portable game machine 301 via the select circuit 804, so that the saved data is written from the portable game machine 400 to the S-RAM 805, and the data is read from the S-RAM 805 and is added to the content of the game of the portable game machine 400.

The decoder 806 located at the upper part of FIG. 8 generates control signals of the home TV game machine 100 and applies the control signals to the select circuit 804, the register 807, the register 808, the state register 812 and the buffer 809 to control these components. The decoder 811 located on the lower part of FIG. 8 generates control signals of the portable game machine 400, and applies the control signals to the select circuit 804, the register 807, the register 808, the state register 812 and the buffer 810 to control these components.

The above mentioned select circuit 804 sets whether the home TV game machine system or the portable game machine system can use the S-RAM 805, depending on the control signals from the decoders 806 and 811, and notifies the setting state to the state register 812 which is described later.

The home TV game machine 100 is connected to the portable game machine 400 by buses via the register 807, and the home TV game machine 100 sends simple image display data and sound effects output instructions to the portable game machine 400 via the register 807. The portable game machine 400 is connected to the home TV game machine 100 by buses via the register 808, and the portable game machine 400 sends input information of the control system and simple data of the display system to the home TV game machine 100 via the register 808. In this way, a simple data exchange is performed between the home TV game machine 100 and the portable game machine 400 using the above mentioned registers 807 and 808.

The state register 812 connected to the select circuit 804 by buses holds the selected state of the S-RAM 805, to either the home TV game machine or the portable game machine. Output of the state register 812 is connected from the bus control circuit 803 to the home TV game machine 100 by buses via the buffer 809, and sends the content of the state register 812 to the home TV game machine 100 via the buffer 809 to notify the selected state. Output of the state register 812 connected to the select circuit 804 by buses is also connected to the portable game machine 400 by buses via the buffer 810, and sends the content of the state register 812 to the portable game machine 400 via the buffer 810 to notify the selected state.

In the connection area with the home TV game machine 100, the bus control circuit 803 which is not interleaved in the connection area with the portable game machine 400 is interleaved in the connection area with the home TV game machine 100, because matching with the multiplexed path used in the internal circuit of the home TV game machine 100 is necessary.

A bi-directional communication game using the above mentioned cartridge is hereafter, described. A "mah-jong" game which two or more individuals can play is used as an example. Only one player can play a mah-jong game with a conventional TV game or a portable game machine, because if two or more individuals play, one player's hand would be revealed to the other players. If the system of the invention is used, however, two or more players can enjoy a mah-jong game because each individual has their own private display. Also, whereas actual mah-jong requires four players to play a game, with the home TV game, the computer plays for the missing human players. Therefore, even two players can play a game.

Display format

Figure 9A:
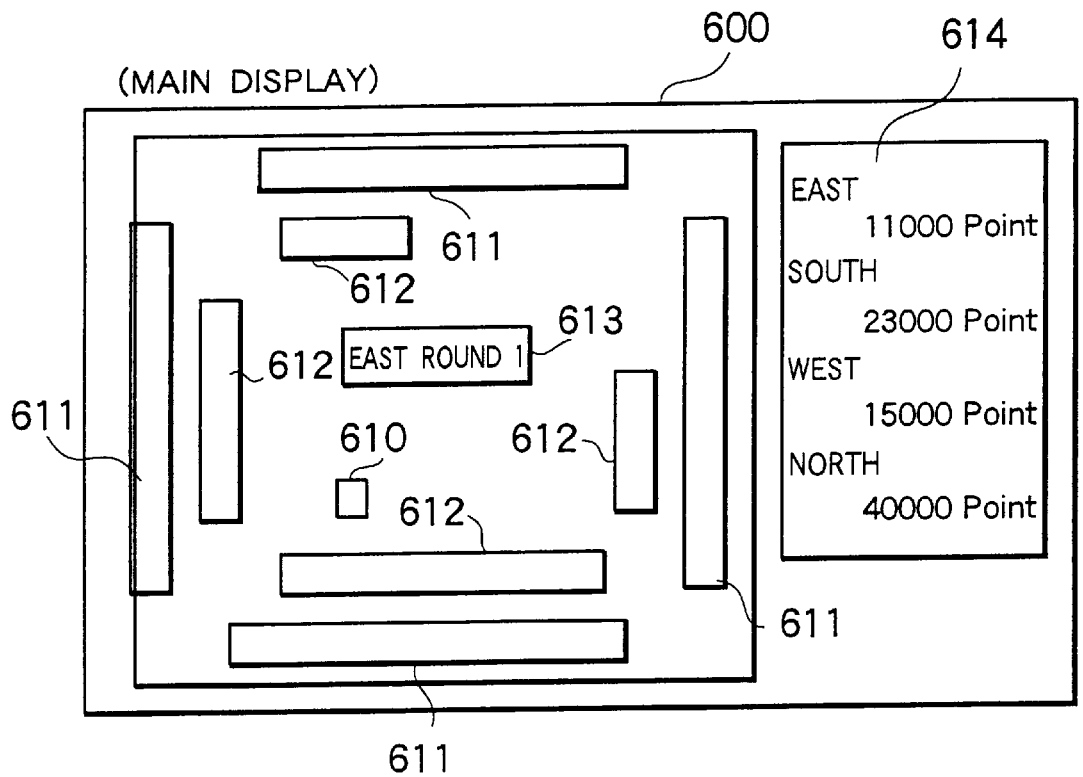
FIGS. 9A–9B are explanatory drawings depicting the TV screen of the home TV game machine and the liquid crystal display of the portable game machine of the embodiment.

As FIG. 9(A) shows, information on a common field related to all players is displayed on the TV 600 connected to the home TV game machine 100. The information displayed includes discarded tiles 610, number of remaining tiles, stacked tiles 611, revealed tiles 612, round wind and seat wind 613, turn indicator (displays the player whose turn it is now), and scores of all players 614.

Figure 9B:
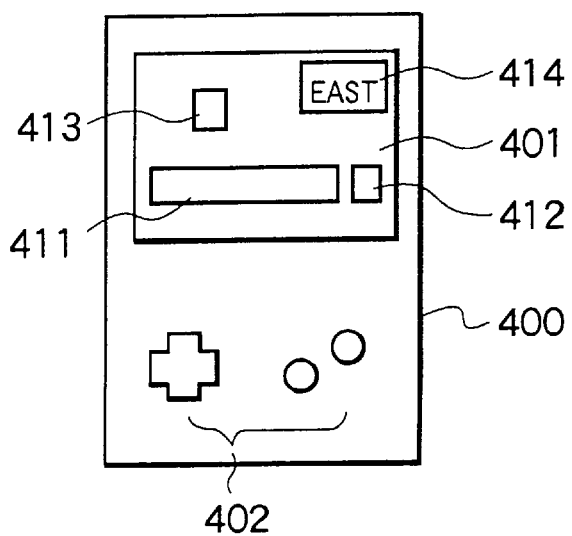

As FIG. 9(B) shows, minimum individual images required to form a player's hand are displayed on the liquid crystal display 401 of the portable game machine 400. These images include tiles in the player's hand 411, tiles the player drew 412, score of the player, dragon files, tiles discarded by other players 413, round wind and seat wind 414, turn (displays the player whose turn it is now) Processing format FIG. 10 shows a major data exchange between the home TV game machine 100 and the portable game machine 400.

Data to be exchanged here is instruction data with a small information volume, such as image display instructions and sound effects output instructions, and saved data and loaded data for storing game results of previous play. Image display data with a large information volume and sound effects data itself are not included. For large information volume image display data and sound effects data, data stored in the ROM of the local machine is used. This decreases the time required for transfers. For this reason, the program has been stored both in the home TV game machine 100 and in the portable game machine 400, i.e., cassette 500 and cartridge 300, respectively. Such instruction data as image display instructions and sound effects output instructions are exchanged via the registers 807 and 808, and saved data and loaded data storing the game results of previous play are exchanged via the S-RAM 805.

At the portable game machine 400, data required for the play of each portable game machine 400 is stored in the ROM 304 of the cartridge 300 which is set to the portable game machine 400. This means that image data and voice data are stored and image data instructions and voice output instructions from the home TV game machine 100 determine which image or voice is output to the display and the speaker.

Therefore, the image display data stored in the ROM of the portable game machine 400 on the display of the portable game machine 400 and the instructions to output sound effects output stored in the above mentioned ROM to the speaker are sent from the home TV game machine 100 to the portable game machine 400.

Signals selected by the control system of the portable game machine 400 are sent from the portable game machine 400 to the home TV game machine 100 as input information of the control system.

Next a flow of one round of the mah-jong is described using the flow chart in FIG. 11. First the ROM cassette 500 housing a mah-jong software (hereafter "master software") for a home TV game machine 100 linked with the portable game machine 400 is set to the ROM cassette insertion port 101 in advance. The cartridge 300 housing mah-jong game software (hereafter "slave software") for a portable game machine 400 linked with the home TV game machine is set to the insertion port connection terminal 403 of the portable game machine 400. The home TV game machine 100 and the portable game machine 400 can exchange data by connecting the home TV game machine 100 and the portable game machine 400 via the cartridge 300 using the communication cable 200.

The power supplies of both the home TV game machine 100 and the portable game machine 400 are turned ON, and the game is started by pressing the start button of the control system 402 of the portable game machine 400 (Step 701). If the previous data saved in the "slave software" is written to the S-RAM 805 at this time, and is read whenever necessary to set to the computer of the home TV game machine 100, a game can be played continuously using the previous data. The TV 600 of the home TV game machine 100 and the liquid crystal display 401 of the portable game machine 400 display prescribed initial screens respectively. The signal from the start button is transmitted from the portable game machine 400 to the home TV game machine 100 via the register 808 in the cartridge 302, the bus control circuit 803 and the communication cable 200. When the home TV game machine 100 receives the above mentioned signal, the CPU 11 accesses the ROM of the cassette 500, sends the image display data for stacking tiles and casting dice and the sound effects data to the TV 600 connected to the home TV game machine 100, and displays the images on the TV 600 along with the sound effects via the music signal generation circuit 15 and the image signal generation circuit 16 (Step 702). When tiles to be distributed to each portable game machine 400 are determined based on the result of casting dice, tile instruction data of an individual player is sent from the home game machine 100 to the portable game machine 400 of each player via-the communication cable 200, the bus control circuit 803 in the cartridge 300, and the register 807. The CPU 431 receives this instruction data, accesses the ROM 304 in the cartridge 300, sends the image display data for stacking tiles and casting dice and the sound effects data to the liquid crystal display 401 of the portable game machine 400, and displays the image on the liquid crystal display 401 of each portable game machine 400 along with the sound effects via the LCD processor 433 and the LCD memory 434 (Step 703).

In the portable game machine 400, the first player draws tiles (Step 704). It is judged whether the player wins with the tiles, and if the player wins, the judgment result is sent to the home TV game machine 100, the score at winning is calculated, and the images of the seat and tiles at this time are displayed on the TV screen of the home TV game machine 100 (Step 706).

If the player does not win in Step 705, the player selects whether to use the advice function in the portable game machine 400 (Step 707). The advice function here uses the operation processing function of the CPU 431 of the portable game machine 400. If this function is used, discard tile advice from the computer on which tile should be discarded is displayed (Step 708), and if this advice function is not used, the player alone decides on a tile to be discarded (Step 709). After the display or the decision of step 708 or 709, the player discards the tile (Step 710).

The discarded tile is displayed on the liquid crystal display 401 of the portable game machine 400, and at this time, the portable game machine 400 sends the discarded tile information to the home game machine 100, and displays the discarded tile on the TV screen of the home TV game machine 100 as well.

If there are tiles that can be revealed in the portable game machine 400, the tiles flash for a specified time (712). The player determines whether to reveal them or not (Step 713), if NO, then the player turn shifts to the next player (Step 714), and the game returns to Step 704 where the player draws tiles. If YES, then it is judged whether the player wins (Step 715), and if the player has not yet won, the game returns to Step 707 where using the advice function is selected. If the player wins, the information is transferred to the home game machine 100, score is calculated by the home game machine 100, images of the seat and the tiles are displayed on the TV screen (Step 716), and one round ends (Step 717).

A thinking game is not established if a player's hand is revealed to the other players. A thinking game, such as in mah-jong, Hanafuda, cards (poker, seven card bridge, canasta), is not possible with one conventional common monitor but would be possible if two or more portable game machines with displays are connected to the common home TV game machine as shown in the embodiment, whereby an individual player's hand and strategy is displayed only on the display of the respective portable game machine.

In the above mentioned embodiment, a mask ROM was used for the ROM cassette 500, but other media, such as CD-ROM and DVD, may be used. The home TV game machine and the portable game machine are connected with the communication cable for cable communication, but this may be wireless communication, such as infrared communication.

Also in the above mentioned embodiment, the home TV game machine was used for explanation, but the present invention can also be applied to a business TV game machine. In the embodiment, the cartridge and the communication cable are separate units but they may be integrated. Also in the above embodiment, the cartridge 300 is set to the portable game machine 400 side, but may be set to the home TV game machine side. The home TV game machine set forth above may include an industrial TV game machine, such as an arcade game machine.

According to the present invention, where an individual player's hand can be displayed only on the display of an individual portable game machine with a simple structure merely by modifying the cartridge, without changing the TV game machine or and a portable game machine, a thinking game, which is not established if a player's hand is revealed to the other players, such as mahjong, Hanafuda and cards, played by two or more players, can be enjoyed. Since data is exchanged between the TV game machine and the portable game machine connected by communication means, the TV game machine and the portable game machine can share the data. The TV game machine can be used jointly by two or more players.

What is claimed is:

1. A cartridge for connecting a portable game machine to a TV game machine, comprising:

a case with a first connection terminal for connection to the TV game machine and a second connection terminal for connection to the portable game machine, wherein the case further comprises:

a bus for connecting the first and the second connection terminals;

an interface connected to the bus for enabling bi-directional communication between the portable game machine and the TV game machine;

a ROM connected to the bus for storing a program content of a prescribed game; and a RAM for storing saved data to be added to the content of the game.

2. The cartridge according to claim 1, wherein the interface further comprises:

a selector for selectively connecting the RAM to at least one of the first connection terminal for the TV game machine and the second connection terminal for the portable game machine;

a state register for storing the selected state of the selector;

a buffer for relaying the content of the state register to the first connection terminal for the TV game machine and the second connection terminal for the portable game machine;

a data register for temporarily storing such data as image display instructions and voice output instructions which are input from the first connection terminal for the TV game machine, outputting the data to the second connection terminal for the portable game machine, temporarily storing such data as input information of a control system which is input from the second connection terminal for the portable game machine, and outputting the data to the first connection terminal for the TV game machine; and a decoder connected to the first and second connection terminals for decoding signals which are input from the first connection terminal for the TV game machine and the second connection terminal for the portable game machine respectively, and generating control signals to be sent to the RAM, the selector, the state register, the data register and the buffer respectively.

3. A game machines comprising:

the cartridge according to claim 1;

the portable game machine wherein the cartridge is detachably set; and a communicator that connects the portable game machine to the TV game machine via the cartridge.

4. A game machines comprising:

the cartridge according to claim 2;

the portable game machine wherein the cartridge is detachably set; and a communicator that connects the portable game machine to the TV game machine via the cartridge.

5. A bi-directional communication type game system, comprising:

at least one portable game machine;

a TV game machine to which the at least one the portable game machine is able to be connected;

the cartridge according to claim 1 being detachably set to the portable game machine;

a cassette containing a program content of a game for the TV game machine to be linked to the program content stored in the ROM provided in the cartridge to provide bi-directional communication between the portable game machine and the TV game machine, the cassette being detachably set to the TV game machine; and a communicator that connects the portable game machine to the TV game machine via the cartridge.

6. A bi-directional communication type game system, comprising:

at least one portable game machine;

a TV game machine to which the at least one the portable game machine is able to be connected;

the cartridge according to claim 2 being detachably set to the portable game machine;

a cassette containing a program content of a game for the TV game machine to be linked to the program content stored in the ROM provided in the cartridge to provide bi-directional communication between the portable game machine and the TV game machine, the cassette being detachably set to the TV game machine; and a communicator which connects the portable game machine to the TV game machine via the cartridge.

\* \* \* \* \*